US012715982B2

(12) United States Patent
Hjärtfors et al.

(10) Patent No.: US 12,715,982 B2
(45) Date of Patent: Aug. 25, 2026

(54) POLYMER FOR CABLE JACKET

(71) Applicant: BOREALIS AG, Vienna (AT)

(72) Inventors: Anna Hjärtfors, Stenungsund (SE); John Jamieson, Porvoo (FI); Ravindra Tupe, Espoo (FI); Pauli Leskinen, Porvoo (FI)

(73) Assignee: BOREALIS AG, Vienna (AT)

( * ) Notice: Subject to any disclaimer, the term of this patent is extended or adjusted under 35 U.S.C. 154(b) by 544 days.

(21) Appl. No.: 17/926,265

(22) PCT Filed: May 19, 2021

(86) PCT No.: PCT/EP2021/063367

§ 371 (c)(1),
(2) Date: Nov. 18, 2022

(87) PCT Pub. No.: WO2021/234040

PCT Pub. Date: Nov. 25, 2021

(65) Prior Publication Data

US 2023/0203286 A1 Jun. 29, 2023

(30) Foreign Application Priority Data

May 20, 2020 (EP) .................................... 20175701

(51) Int. Cl.
*C08L 23/0807* (2025.01)
*H01B 3/44* (2006.01)

(52) U.S. Cl.
CPC .......... *C08L 23/0815* (2013.01); *H01B 3/441* (2013.01); *C08L 2203/202* (2013.01); *C08L 2205/025* (2013.01)

(58) Field of Classification Search
CPC ........... C08L 23/0815; C08L 2203/202; C08L 2205/025; C08L 2314/06; H01B 3/441; C08F 210/16; C08F 210/14; C08F 2500/12; C08F 2500/04; C08F 2500/34; C08F 2500/30; C08F 2500/27; C08F 2500/02; C08F 2500/17; C08F 210/08; C08F 2500/36
See application file for complete search history.

(56) References Cited

U.S. PATENT DOCUMENTS

| | | | | |
|---|---|---|---|---|
| 8,674,024 B2 * | 3/2014 | Buryak | C08F 110/02 | 525/240 |
| 9,234,061 B2 | 1/2016 | Vahteri et al. | | |
| 2007/0049711 A1 | 3/2007 | Kuo et al. | | |
| 2011/0290529 A1 * | 12/2011 | Pakkanen | C08L 23/04 | 174/120 SR |
| 2020/0207885 A1 * | 7/2020 | Curren | B01J 8/1827 | |

FOREIGN PATENT DOCUMENTS

| | | | | |
|---|---|---|---|---|
| EP | 0517868 B1 | 11/1995 | | |
| EP | 1739103 A1 | 1/2007 | | |
| EP | 1752462 A1 | 2/2007 | | |
| EP | 1539775 B1 | 1/2008 | | |
| EP | 2182524 A1 * | 5/2010 | C08F 210/16 | |
| EP | 2182525 A1 | 5/2010 | | |
| EP | 2182526 A1 * | 5/2010 | C08F 210/16 | |
| EP | 2354183 A1 | 8/2011 | | |
| EP | 2746300 A1 | 6/2014 | | |
| EP | 3009457 A1 | 4/2016 | | |
| EP | 3252085 A1 | 12/2017 | | |
| WO | 97/28170 A1 | 8/1997 | | |
| WO | 98/32776 A1 | 7/1998 | | |
| WO | 99/61489 A1 | 12/1999 | | |
| WO | 03/010208 A1 | 2/2003 | | |
| WO | 03/051514 A1 | 6/2003 | | |
| WO | 03/051934 A2 | 6/2003 | | |
| WO | 2004/085499 A2 | 10/2004 | | |

OTHER PUBLICATIONS

International Search report and written opinion mailed Jul. 23, 2021 in International Application No. PCT/EP2021/063367.

* cited by examiner

*Primary Examiner* — Jennifer A Steele
(74) *Attorney, Agent, or Firm* — Meunier Carlin & Curfman LLC

(57) ABSTRACT

A multimodal polyethylene composition having a lower molecular weight (LMW) ethylene homo or copolymer component (A) and a higher molecular weight ethylene copolymer component (B); wherein the LMW component comprises two fractions (ai) and (aii); wherein the polymer composition has a density of 930 kg/m3 or more (ISO1183), such as 938 to 955 kg/m3, an MFR2 (ISO1133 at 190° C. and 2.16 kg load) in the range of 0.05 to 10 g/10 min, a flex modulus of up to 800 MPa (ISO 178:2010), such as 300 to 800 MPa (ISO 178:2010) and a taber abrasion resistance of 8.0 to 13.0 mg/1000 cycle (ASTM D 4060: 2014).

20 Claims, No Drawings

POLYMER FOR CABLE JACKET

FIELD OF INVENTION

This invention relates to a multimodal polyethylene composition suitable for use as a cable jacket, for example, as a cable jacket in a communication cable or a power cable. The invention also relates to a cable comprising the multimodal polyethylene composition as defined herein in a layer, such as a cable jacketing layer. In further embodiments, the invention relates to processes for the preparation of the multimodal polyethylene composition and process for preparing cables comprising said multimodal polyethylene composition.

BACKGROUND ART

A typical power cable comprises a conductor surrounded, at least, by an inner semiconductive layer, an insulation layer and an outer semiconductive layer, in that order. The cable is then also provided with a cable jacket.

The cables are commonly produced by extruding the layers on a conductor. Flexibility and abrasion resistance are two of the key properties of a cable jacket material. Flexibility allows the cable to be more easily handled during installation and better abrasion resistance makes cable more robust during installation in the ground. There is a general need therefore for a flexible and abrasion resistant cable. A more robust cable may allow the use of a thinner jacket making the cable lighter, more flexible and cheaper.

EP 2182526 describes certain LLDPEs for use in cable jackets. The examples describe multimodal metallocene produced LLDPEs with a particular Mz/Mw value. The claimed materials offer cable jackets with enhanced surface smoothness and processability.

EP2182524 describes multimodal metallocene LLDPEs for cable jacket applications that have very low flex modulus and good processability.

It would be useful to prepare a polymer for a cable jacket that has low flex modulus and good abrasion resistance. Lower density polyethylenes tend to offer poor abrasion resistance but improved flex modulus. Maximising both of these parameters is challenging. The present inventors have found that certain medium/high density multimodal polyethylene compositions can provide a flexible material with higher abrasion resistance.

The multimodal polyethylene composition of the invention is produced using a split loop configuration, which enables a broadening of the molecular weight distribution thus improving the processability of the material.

SUMMARY OF THE INVENTION

Viewed from one aspect the invention provides a multimodal polyethylene composition having a lower molecular weight (LMW) ethylene homo or copolymer component (A) and a higher molecular weight ethylene copolymer component (B);

- wherein the LMW component comprises two fractions (ai) and (aii);
- wherein the polymer composition has a density of 930 kg/m$^3$ or more (ISO1183), an $MFR_2$ (ISO1133 at 190° C. and 2.16 kg load) in the range of 0.05 to 10 g/10 min, a flexural modulus of up to 800 MPa (ISO 178:2010), such as 300 to 800 MPa (ISO 178:2010) and a taber abrasion resistance of 8.0 to 13.0 mg/1000 cycle (ASTM D 4060: 2014).

Viewed from another aspect the invention provides a multimodal polyethylene composition produced by polymerising ethylene in at least two slurry reactors and at least one gas phase reactor connected in series whereby the polyethylene composition comprises:

- a lower molecular weight (LMW) ethylene homo or copolymer component (A) and a higher molecular weight ethylene copolymer component (B) wherein a single site catalyst is used in the polymerisation of at least one of the LMW or HMW components;
- wherein the LMW component comprises two fractions (ai) and (aii) prepared in a first and second slurry loop reactors respectively;
- wherein the polymer composition has a density of 930 kg/m$^3$ or more (ISO1183), an $MFR_2$ (ISO1133 at 190° C. and 2.16 kg load) in the range of 0.05 to 10 g/10 min, a flexural modulus of up to 800 MPa and a taber abrasion resistance of 8.0 to 13.0 mg/1000 cycle (ASTM D 4060: 2014).

Viewed from another aspect the invention provides a cable comprising a conductor surrounded by at least one layer, such as a jacketing layer, comprising a multimodal polyethylene composition as hereinbefore defined.

Viewed from another aspect the invention provides a power cable comprising a conductor surrounded by an inner semiconductive layer, an insulating layer, an outer semiconductive layer and a jacketing layer, wherein at least the jacketing layer comprises a multimodal polyethylene composition as defined herein.

Viewed from another aspect the invention provides a process for the preparation of a multimodal polyethylene composition comprising lower molecular weight (LMW) ethylene homo or copolymer component (A) and a higher molecular weight ethylene copolymer component (B), said process comprising:

- (I) polymerizing ethylene and optionally at least one C3-10 alpha olefin comonomer in the presence of a single site catalyst in a first slurry reactor to produce a fraction (ai);
- (II) polymerizing ethylene and optionally at least one C3-10 alpha olefin comonomer in the presence of the single site catalyst and fraction (ai) in a second slurry reactor so as to prepare a fraction (aii) which together with fraction (ai) forms said lower molecular weight ethylene homo or copolymer component (A); and
- (III) in the presence said LMW ethylene homo or copolymer component (A) and said single site catalyst, polymerizing ethylene and at least one C3-10 alpha olefin comonomer so as to form said higher molecular weight ethylene copolymer component (B);
- wherein said multimodal polyethylene composition has a density of 930 kg/m$^3$ or more, an $MFR_2$ (ISO1133 at 190° C. and 2.16 kg load) in the range of 0.05 to 10 g/10 min, a flex modulus of up to 800 MPa and a taber abrasion resistance of 8.0 to 13.0 mg/1000 cycle (ASTM D 4060: 2014).

It is particularly preferred if fractions (ai) and (aii) are prepared in first and second slurry reactors and that component (B) is prepared in a gas phase reactor, all three reactors being connected in series.

Thus, viewed from another aspect, the invention provides a process for polymerizing ethylene in at least two slurry reactors and at least one a gas phase reactor connected in series to prepare a multimodal polyethylene composition, wherein said multimodal polyethylene composition comprises a lower molecular weight (LMW) ethylene homo or copolymer component (A) and a higher molecular weight ethylene copolymer component (B), wherein a single site catalyst is used in the polymerisation of at least one of the LMW or HMW components, the composition having a density of 930 $kg/m^3$ or more, an $MFR_2$ (ISO1133 at 190° C. and 2.16 kg load) in the range of 0.05 to 10 g/10 min, a flex modulus of up to 800 MPa and a taber abrasion resistance of 8.0 to 13.0 mg/1000 cycle (ASTM D 4060: 2014);

wherein fraction (A) comprises two fractions (ai) and (aii) whereby fraction (ai) is produced in a first slurry loop reactor and fraction (aii) produced in a second slurry loop reactor.

Viewed from another aspect the invention provides the use of a multimodal polyethylene composition as defined herein in the manufacture of a cable, especially the jacketing layer of cable, such as a power cable.

Viewed from another aspect the invention provides a process for producing a cable comprising the steps of applying on a conductor, at least one layer comprising a multimodal polyethylene composition as defined herein.

Viewed from another aspect the invention provides a process for producing a cable comprising the steps of applying on a conductor an inner semiconductive layer comprising a first semiconductive composition, an insulation layer comprising an insulation composition, an outer semiconductive layer comprising a second semiconductive composition and a jacketing layer in that order, wherein the composition of at least one layer, preferably the jacketing layer, comprises a multimodal polyethylene composition as defined herein.

DETAILED DESCRIPTION OF INVENTION

The present invention relates to a multimodal polyethylene composition which is ideally suited for use in the jacketing layer of a cable. Unexpectedly, the multimodal polyethylene composition of the present invention has advantageous mechanical properties, e.g. the flex modulus is low and abrasion resistance is high. This is achieved without any crosslinking by means of a crosslinking agent, such as peroxide. The multimodal polyethylene composition is also processable.

Multimodal Polyethylene Composition

The multimodal polyethylene composition of the invention is a medium or high density multimodal polyethylene composition having a density of 930 $kg/m^3$ or more, preferably 938 $kg/m^3$ or more, such as 938 to 955 $kg/m^3$ (measured using ISO 1183).

A preferred range is 934 to 955 $kg/m^3$, such as 938 to 950 $kg/m^3$, more preferably 938 $kg/m^3$ to 946 $kg/m^3$, especially 940 to 945 $kg/m^3$.

The term multimodal means multimodal with respect to molecular weight distribution (MWD=Mw/Mn). Generally, a polymer comprising at least two polymer fractions, which have been produced under different polymerisation conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions.

For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

The term "multimodal" therefore means herein, unless otherwise stated, multimodality at least with respect to molecular weight distribution (MWD=Mw/Mn) and includes also bimodal polymer.

It is preferred if the multimodal polyethylene composition of the invention is trimodal.

It is preferred if the multimodal polyethylene composition of the invention consists of the lower and higher molecular weight components.

It is preferred if the lower molecular weight component consists of the fractions (ai) and (aii) (and optionally the prepolymer component) and hence the multimodal polyethylene composition of the invention preferably consists of fractions (ai) and (aii) and the higher molecular weight components (and optionally the prepolymer component).

The multimodal polyethylene composition may have a Mw/Mn (MWD) of at least 4, for example, 5 to 15, preferably 5 to 12 (measured by GPC).

The multimodal composition may have an $MFR_2$ of 0.05 to 5.0 g/10 min, preferably 0.1 to 4.0 g/10 min, more preferably 0.25 to 3.5 g/10 min (ISO1133, at 190° C. and 2.16 kg load).

The multimodal composition may have an $MFR_{21}$ of 10 to 100 g/10 min, preferably 15 to 90 g/10 min (ISO1133, at 190° C. and 21.6 kg load).

The multimodal polyethylene composition comprises at least one C3-10 alpha olefin comonomer(s), preferably at least one C3-8 alpha olefin comonomer(s). In some embodiments, the multimodal polyethylene composition comprises at least two C3-10 alpha olefin comonomers, preferably at least two C3-8 alpha olefin comonomers. The term comonomer as used herein means monomer units other than ethylene, which are copolymerisable with ethylene.

The olefin comonomer(s) is preferably a $C_{4-10}$ alpha-olefins, e.g. 1-butene, 1-hexene or 1-octene. A particularly preferred multimodal polyethylene composition comprises 1-butene and 1-hexene as comonomers.

The amount of comonomer(s) present in the multimodal polyethylene composition of the invention may be 0.25 to 2.0 mol %, such as 0.5 to 1.5 mol %, preferably 0.5 to 1.0 mol %. This can be determined using NMR.

The multimodal composition of the invention may have a flex modulus of up to 800 MPa, such as 200 to 800 MPa, more preferably 300 to 800 MPa, such as 500 to 775 MPa.

The multimodal polyethylene composition of the invention may also have an eta300 value of less than 1000 Pa·s, such as 100 to 800 Pa·s.

The multimodal polyethylene composition of the invention may also have an eta0.05 value of more than 3000 Pa·s, such as 3500 to 7000 Pa·s.

The melting point of the multimodal polyethylene composition is preferably, at least 122° C., such as in the range of 122 to 135° C., more preferably 123 to 132° C., especially 124 to 130° C. In one embodiment, the ratio between flexural modulus and melting point is between 4.5 and 6.5 (flex mod·in MPa/melting point in celsius), preferably between 5.0 and 6.0. This is a key feature that defines a low flexural modulus with retained high melting point.

The multimodal polyethylene composition of the invention may have a tensile strain at break of 600 to 800%.

The multimodal polyethylene composition of the invention may have a Shore D hardness after 3 seconds of 55 to 65.

The multimodal polyethylene composition of the invention may have a tensile stress at break 25 to 45 MPa, especially 30 to 40 MPa.

The multimodal polyethylene composition of the invention may have a taber resistance of 8.0 to 13.0 mg/1000 cycles, such as 8.0 to 12.0 mg/1000 cycles.

The multimodal polyethylene composition of the invention may have a relaxation vs time of 1.0 to 3.0 seconds.

Components of the Multimodal Polyethylene Composition

The multimodal polyethylene composition of the invention comprises a LMW component which is an ethylene homo or copolymer and a HMW component which is an ethylene copolymer. The expression 'ethylene homopolymer' according to the present invention relates to an ethylene polymer that consists substantially of ethylene and thus is an ethylene polymer which only includes ethylene monomer units.

The comonomer(s) present in the LMW and HMW components may be the same or different, preferably different. The comonomer present in the fractions (ai) and (aii) of the LMW component may be the same or different, preferably the same. For example 1-butene may be used for the fractions of the LMW component and 1-hexene may be employed in the HMW component. Where there are at least two different comonomers present, the multimodal polyethylene composition of the invention is regarded as a terpolymer herein.

Any component or fraction of the multimodal polyethylene composition may also be a terpolymer which means that at least one component (A) or (B) or fraction (ai) or (aii) comprises ethylene and at least two different C3-10 alpha olefin comonomers.

The LMW component may be a homopolymer or an ethylene copolymer with at least one C4-10 alpha olefin, especially an ethylene 1-butene copolymer.

Preferably the component is an ethylene copolymer with at least one C4-10 alpha olefin, especially an ethylene 1-hexene copolymer or ethylene 1-octene copolymer.

In a further embodiment, the V component is an ethylene terpolymer with at least two C4-10 alpha olefins, especially an ethylene, 1-butene and 1-hexene terpolymer.

The multimodal polyethylene composition as defined herein comprises a lower weight average molecular weight (LMW) component (A) and a higher weight average molecular weight (HMW) component (B). Said LMW component has a lower molecular weight than the HMW component, e.g. by at least 5000 mass units. Alternatively viewed, said LMW component has a higher $MFR_2$ than the HMW component, e.g. by at least 1.0 g/10 min.

It is Preferred if the Multimodal Polyethylene Composition Comprises:

(A) a lower molecular weight ethylene homopolymer or copolymer component of ethylene and one or more C3-10 alpha olefins; and (B) a higher molecular weight ethylene copolymer component of ethylene and one or more C3-10 alpha olefins.

More Preferably, the Multimodal Polyethylene Composition Comprises (A) a lower molecular weight ethylene omopolmer or copolymer component with one or more C3-8 alpha olefins; and (B) a higher molecular weight ethylene copolymer component with one or more C3-8 alpha olefins.

The split between components (A) and (B) can be controlled. A multimodal polyethylene composition of the invention may have 35 to 60 wt %, preferably 35 to 55 wt % of said lower molecular weight component (A) and 40 to 65 wt %, preferably 45 to 65 wt % of said higher molecular weight component (B), preferably 38 to 52 wt % of said lower molecular weight component (A) and 48 to 62 wt % of said higher molecular weight component (B).

The LMW component (A) may have $MFR_2$ of 20 to 500 g/10 min, such as 20 to 200 g/10 min. As the HMW component tends to be produced in the presence of the LMW component in a multistage process, its properties often cannot be directly measured but they can be estimated using the Hagström equation.

The LMW component (A) may have a density of 940 to 970 $kg/m^3$.

The LMW component (A) of the multimodal polyethylene composition is itself made up of two fractions (ai) and (aii). Hence the lower molecular weight component may comprise:

(ai) a first fraction which comprises an ethylene homo or copolymer of ethylene and one or more C3-10 alpha olefins; and (aii) a second fraction which comprises a different ethylene homo or copolymer of ethylene and one or more C3-10 alpha olefins.

Preferably, the Lower Molecular Weight Component Comprises (ai) 40 to 60 wt % of a first fraction; and (aii) 40 to 60 wt % of a second fraction.

Preferably, the Lower Molecular Weight Component Comprises (ai) 40 to 60 wt % of a first ethylene homopolymer fraction or copolymer fraction of ethylene and one or more C3-8 alpha olefins; and (aii) 40 to 60 wt % of a second different ethylene homopolymer fraction or copolymer fraction of ethylene and one or more C3-8 alpha olefins.

In a preferred embodiment there can be 45 to 55 wt % of (ai) and 55 to 45 wt % of (aii).

It is therefore preferred if each fraction (ai) and (aii) forms at least 5.0 wt % of the overall multimodal polyethylene composition. It is preferred if each fraction (ai) and (aii) forms at least 7.5 wt % of the overall multimodal polyethylene composition.

Each fraction (ai) and (aii) of the LMW component ideally forms at least 10 wt % of the multimodal polyethylene composition, such as at least 12 wt % of the multimodal polyethylene composition.

Each fraction (ai) and (aii) of the LMW component ideally forms 10 to 30 wt % of the multimodal polyethylene composition, such as at least 12 to 30 wt % of the multimodal polyethylene composition.

The weight ratio between fractions (ai) and (aii) of the LMW component is preferably in the range of 1:5 to 5:1, such as 4:1 to 1:4. Each fraction (ai) and (aii) preferably forms at least 20 wt % of the LMW component, such as at least 30 wt % of the LMW component.

It is preferred if the comonomer used in both fractions of the LMW component is the same and it is more preferred if this is 1-butene. Alternatively, the LMW component (A) can be a homopolymer, i.e. both fractions (ai) and (aii) are homopolymers. These fractions still need to differ, e.g. in terms of density or MFR.

It is preferred if the $MFR_2$ of the fraction (ai) is lower than fraction (aii), e.g. by at least 1.0 g/10 min.

Fraction (ai) preferably has an $MFR_2$ of 10 to 40 g/10 min.

Fraction (ai) preferably has a density of 945 to 980 kg/$m^3$.

The properties of the lower molecular weight component discussed herein can be regarded as those of the combination of fractions (ai) and (aii) (and optionally the prepolymer component).

More preferably, the multimodal polyethylene composition comprises a lower molecular weight ethylene 1-butene copolymer component; and a higher molecular weight ethylene 1-hexene copolymer component, especially wherein the lower molecular weight component comprises:

(ai) a first ethylene 1-butene copolymer fraction; and (aii) a second different ethylene 1-butene copolymer fraction.

More preferably, the multimodal polyethylene composition comprises a lower molecular weight ethylene homopolymer component; and a higher molecular weight ethylene 1-hexene copolymer component, especially wherein the lower molecular weight component comprises:

(ai) a first ethylene homopolymer fraction; and (aii) a second different ethylene homopolymer fraction.

Without wishing to be limited by theory, it is envisaged that the use of this split lower molecular weight component structure leads to certain reductions in flex modulus.

In a highly preferred embodiment, the invention defines a multimodal polyethylene composition comprising (A) 35 to 60 wt % of a lower molecular weight ethylene homopolymer or copolymer component comprising:

(ai) 40 to 60 wt % of a first ethylene homopolymer fraction or copolymer fraction of ethylene and one or more C3-10 alpha olefins; and (aii) 40 to 60 wt % of a second different ethylene homopolymer fraction or copolymer fraction of ethylene and one or more C3-10 alpha olefins;

(B) 40 to 65 wt % of a higher molecular weight ethylene copolymer component of ethylene and one or more C3-10 alpha olefins;

wherein the polymer composition has a density of 930 kg/$m^3$ or more (ISO1183), such as 938 to 955 kg/$m^3$, an $MFR_2$ (ISO1133 at 190° C. and 2.16 kg load) in the range of 0.05 to 10 g/10 min, a flex modulus of up to 800 MPa (ISO 178:2010), such as 300 to 800 MPa (ISO 178:2010) and a taber abrasion resistance of 8.0 to 13.0 mg/1000 cycle (ASTM D 4060: 2014).

In a highly preferred embodiment, the invention defines a multimodal polyethylene composition comprising at least two C3-10 alpha olefin comonomers, said composition comprising (A) a lower molecular weight ethylene homopolymer or copolymer component comprising:

(ai) 40 to 60 wt % of a first ethylene homopolymer fraction or copolymer fraction of ethylene and one or more C3-10 alpha olefins; and (aii) 40 to 60 wt % of a second different ethylene homopolymer fraction or copolymer fraction of ethylene and one or more C3-10 alpha olefins; and (B) 40 to 65 wt % of a higher molecular weight ethylene copolymer component of ethylene and one or more C3-10 alpha olefins;

wherein the polymer composition has a density of 930 kg/$m^3$ or more (ISO1183), such as 938 to 955 kg/$m^3$, an $MFR_2$ (ISO1133 at 190° C. and 2.16 kg load) in the range of 0.05 to 10 g/10 min, a flex modulus of up to 800 MPa (ISO 178:2010), such as 300 to 800 MPa (ISO 178:2010) and a taber abrasion resistance of 8.0 to 13.0 mg/1000 cycle (ASTM D 4060: 2014).

Alternatively viewed, the invention defines a multimodal polyethylene composition comprising (ai) 14 to 36 wt % of a first ethylene homopolymer fraction or copolymer fraction of ethylene and one or more C3-10 alpha olefins; and (aii) 14 to 36 wt % of a second different ethylene homopolymer fraction or copolymer fraction of ethylene and one or more C3-10 alpha olefins; and (B) 40 to 65 wt % of a higher molecular weight ethylene copolymer component of ethylene and one or more C3-10 alpha olefins;

wherein the polymer composition has a density of 930 kg/$m^3$ or more (ISO1183), such as 938 to 955 kg/$m^3$, an $MFR_2$ (ISO1133 at 190° C. and 2.16 kg load) in the range of 0.05 to 10 g/10 min, a flex modulus of up to 800 MPa (ISO 178:2010), such as 300 to 800 MPa (ISO 178:2010) and a taber abrasion resistance of 8.0 to 13.0 mg/1000 cycle (ASTM D 4060: 2014).

It is Preferred if the Multimodal Polyethylene Composition Comprises (ai) 16 to 28 wt % of a first ethylene homopolymer fraction or copolymer fraction of ethylene and one or more C3-10 alpha olefins; and (aii) 16 to 28 wt % of a second different ethylene homopolymer fraction or copolymer fraction of ethylene and one or more C3-10 alpha olefins.

In all embodiments of the invention, the multimodal polyethylene composition is preferably non-crosslinked. Alternatively viewed, the multimodal polyethylene composition is thermoplastic.

It is a further feature of the invention that the thermal conductivity of the polymer is improved. High thermal conductivity leads to higher power transmission capacity or lower losses.

All the properties above can be determined in the presence or absence of standard additives.

In a most preferred embodiment therefore the invention provides a multimodal polyethylene composition having a density of 930 kg/$m^3$ or more, preferably 938 kg/$m^3$ or more, an $MFR_2$ in the range of 0.05 to 10 g/10 min, a flexural modulus of up to 800 MPa (ISO 178:2010), such as 300 to 800 MPa (ISO 178:2010) and a taber abrasion resistance of 8.0 to 13.0 mg/1000 cycle (ASTM D 4060: 2014), comprising:

(A) 35 to 55 wt % of a lower molecular weight ethylene homopolymer or copolymer component comprising:

(ai) 40 to 60 wt % of a first ethylene homopolymer fraction or copolymer fraction of ethylene and one or more C3-8 alpha olefins; and (aii) 40 to 60 wt % of a second different ethylene homopolymer fraction or copolymer fraction of ethylene and one or more C3-8 alpha olefins;

(B) 65 to 45 wt % of a higher molecular weight ethylene copolymer component of ethylene and one or more C3-8 alpha olefins.

Catalyst for the Preparation of the Multimodal Polyethylene Composition

The multimodal polyethylene composition of the invention is one that is preferably prepared using a single site catalyst, preferably a metallocene catalyst, especially one with two cyclopentadienyl type ligands. The same catalyst is preferably used to prepare all components.

The expression "a single site polyethylene (SSPE)" means that the polyethylene is polymerised in the presence of a single site catalyst which is a conventional coordination catalyst. The single site catalyst may suitably be a metallocene catalyst. Such catalysts comprise a transition metal compound which contains a cyclopentadienyl, indenyl or fluorenyl ligand. The catalyst preferably contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups and like. Suitable metallocene compounds are known in the art and are disclosed, among others, in WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Especially, the metallocene compound must be capable of producing polyethylene having sufficiently high molecular weight, which is needed in order to guarantee good mechanical properties of, for example, a cable jacket.

One example of suitable metallocene compounds is the group of metallocene compounds having zirconium, titanium or hafnium as the transition metal and one or more ligands having indenyl structure bearing a siloxy substituent, such as [ethylenebis(3,7-di(tri-isopropylsiloxy)inden-1-yl)] zirconium dichloride (both rac and meso), [ethylenebis(4,7-di(tri-isopropylsiloxy)inden-1-yl)]zirconium dichloride (both rac and meso), [ethylenebis(5-tert-butyldimethylsiloxy)inden-1-yl)]zirconium dichloride (both rac and meso), bis(5-tert-butyldimethylsiloxy)inden-1-yl)zirconium dichloride, [dimethylsilylenenebis(5-tert-butyldimethylsiloxy)inden-1-yl)]zirconium dichloride (both rac and meso), (N-tert-butylamido)(dimethyl)($\eta^5$-inden-4-yloxy)silanetitanium dichloride and [ethylenebis(2-(tert-butyldimethylsiloxy)inden-1-yl)]zirconium dichloride (both rac and meso).

Another example is the group of metallocene compounds having zirconium or hafnium as the transition metal atom and bearing a cyclopentadienyl type ligand, such as bis(n-butylcyclopentadienyl)hafnium/Zr dichloride, bis(n-butylcyclopentadienyl) dibenzyl hafnium/Zr, dimethylsilylenenebis(n-butylcyclopentadienyl)hafnium/Zr dichloride (both rac and meso) and bis[1,2,4-tri(ethyl)cyclopentadienyl]hafnium/Zr dichloride.

Still another example is the group of metallocene compounds bearing a tetrahydroindenyl ligand such as bis(4,5,6,7-tetrahydroindenyl)zirconium dichloride, bis(4,5,6,7-tetrahydroindenyl)hafnium dichloride, ethylenebis(4,5,6,7-tetrahydroindenyl)zirconium dichloride, dimethylsilylenebis(4,5,6,7-tetrahydroindenyl)zirconium dichloride. The use of bis(1-methyl-3-n-butylcyclopentadienyl) zirconium (IV) chloride is especially preferred.

A suitable single site catalyst may thereby especially be alumoxane containing, supported catalyst containing metallocene bis(1-methyl-3-n-butylcyclopentadienyl) zirconium (IV) chloride and with enhanced ActivCat® activator technology from Albemarle (Grace) Corporation.

The single site catalyst typically also comprises an activator. Generally used activators are aluminoxane compounds, such as methylalumoxane (MAO), tetraisobutylalumoxane (TIBAO) or hexaisobutylalumoxane (HIBAO). Also boron activators, such as those disclosed in US-A-2007/049711 may be used. The activators mentioned above may be used alone or they may be combined with, for instance, aluminium alkyls, such as triethylaluminium or tri-isobutylaluminum.

Depending on the polymerisation process, the single site catalyst may be supported. The support may be any particulate support, including inorganic oxide support, for example, silica, alumina or titanium, or a polymeric support, for example, a polymeric support comprising styrene or divinylbenzene.

The catalyst may also be prepared according to emulsion solidification technology. Such catalysts are disclosed, among others, in EP-A-1539775 or WO-A-03/051934.

Process

The multimodal polyethylene composition can be produced by blending mechanically together two or more separate polymer components or, preferably, by in-situ blending during a polymerisation process. Both mechanical and in-situ blending are well known in the field. The multimodal polyethylene composition of the invention is preferably prepared in two or more reactors or zones connected in series as described in EP-A-0517868.

The polymerisation may be effected in bulk, slurry, solution, or gas phase conditions or in any combinations thereof. In one embodiment, the multistage process involves a first polymerisation step (LMW component) carried out in at least one slurry, e.g. loop, reactor, preferably two slurry reactors, and a second polymerisation step (BMW component) in a gas phase reactor.

In addition to actual polymerization steps, the process can contain a prepolymerization step. Optionally and advantageously, the main polymerisation stages may be preceded by a pre-polymerisation, in which case a prepolymer is produced, most preferably in an amount of for example 0.1 to 5% or 1 to 3% by weight of the total amount of polymers is produced. The pre-polymer may be an ethylene homo- or copolymer. If a pre-polymerisation takes place, in this case all of the catalyst is preferably charged into the first prepolymerisation reactor and the prepolymerisation is performed as slurry polymerisation. Thus, the prepolymerization step may be conducted in a loop reactor. Such a polymerisation leads to less fine particles being produced in the following reactors and to a more homogeneous product being obtained in the end.

The prepolymerization is preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

In the present invention it is preferred that the prepolymerisation operates at a temperature between 40 to 70° C., more preferred between 50 to 65° C. and preferably at a pressure of 50 to 70 bar, more preferably of 55 to 65 bar.

The molecular weight of the prepolymer may be controlled by hydrogen as it is known in the art. Note that where a prepolymerisation step is used, any weight percentage of product produced in such a step should be considered part of component (A) and should be taken into account when identifying the weight percentage of component (A). Preferably, any prepolymer can be regarded as part of the first fraction (ai) and its weight can be considered part of the weight of fraction (ai).

After prepolymerisation, the main polymerisation takes place preferably in two slurry reactors then a gas phase reactor.

The LMW component is ideally produced in a first polymerization stage which is preferably a slurry polymerization. The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 1 to about 50% by mole, preferably from about 2 to about 20% by mole and in particular from about 2 to about 10% by mole.

The temperature in the first slurry reactor is typically from 60 to 100° C., preferably from 70 to 90° C. An excessively high temperature should be avoided to prevent partial dissolution of the polymer into the diluent and the fouling of the reactor. The pressure may range from 40 to 70 bar, preferably from 50 to 60 bar.

The temperature in the second slurry reactor is typically from 60 to 100° C., preferably from 70 to 90° C. The pressure may range from 40 to 70 bar, preferably from 50 to 60 bar.

The slurry polymerization may be conducted in any known reactor used for slurry polymerization. Such reactors include a continuous stirred tank reactor and a loop reactor. It is especially preferred to conduct the polymerization in a loop reactor.

Hydrogen can be introduced to control the $MFR_2$ of the LMW component. The amount of hydrogen needed to reach the desired MFR depends on the catalyst used and the polymerization conditions.

The comonomer can be introduced into the first polymerization stage. The amount of comonomer needed to reach the desired density depends on the comonomer type, the catalyst used and the polymerization conditions.

The average residence time in the first polymerization stage is typically from 20 to 120 minutes, preferably from 30 to 80 minutes.

It is preferred if the LMW component is produced in two loop reactors in series. The first loop reactor forms a first fraction and the second loop reactor forms a second fraction of the LMW component.

The $MFR_2$ after loop2 can be up to double or 1.5 times the $MFR_2$ after loop1. Thus the $MFR_2$ of the first fraction (ai) is lower than the $MFR_2$ of the LMW component as a whole. Ideally, the MFR increases from first to second fraction).

Generally the quantity of catalyst used will depend upon the nature of the catalyst, the reactor types and conditions and the properties desired for the polymer product.

Gas phase polymerisation can be carried out using known conditions. In general, the temperature in gas phase polymerisation is typically from 60 to 105° C., e.g., 70 to 90° C. The pressure is from 10 to 40 bar, for example, 15 to 20 bar.

The obtained polymerisation product, may be compounded in a known manner and optionally with additive(s) and pelletised for further use.

The resulting end product consists of an intimate mixture of the polymers from the three main reactors, the different molecular-weight-distribution curves of these polymers together forming a molecular-weight-distribution curve having a broad maximum or three maxima, i.e. the end product is a trimodal polymer mixture.

It is most preferred that the polymerization is carried out in a prepolymerization reactor/two slurry loop reactors/a gas-phase reactor. Preferably, the polymerization conditions in the preferred four-step method are chosen so that fraction (ai) is produced in one step in a first slurry loop reactor, fraction (aii) is produced in a second step in a second slurry loop reactor and fraction (B) is produced in further step, preferably the third reactor. The order of these steps may, however, be reversed.

Cables

The multimodal polyethylene composition of the invention is ideally used in a layer in a cable such as the jacketing layer of a cable. Typically, a polymer composition comprising the multimodal polyethylene composition of the invention and one or more additional components, such as additives, is prepared and can be used in the jacketing layer of a cable. Such a jacketing layer may comprise at least 80 wt % of the multimodal polyethylene composition, such as at least 90 wt % of the multimodal polyethylene composition.

In some embodiments, the multimodal polyethylene composition is the only polymer component present in the jacketing layer (other than any masterbatch carrier polymers that may be present).

The jacketing layer may comprise further components other than the multimodal polyethylene composition, such as additives which may optionally be added in a mixture with a carrier polymer, i.e. in so called master batch.

The jacketing layer in the cable may contain, in addition to the multimodal polyethylene of the invention further component(s) such as antioxidant(s), stabiliser(s), processing aid(s), flame retardant additive(s), water tree retardant additive(s), acid or ion scavenger(s), inorganic filler(s) and voltage stabilizer(s), as known in the polymer field.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

The multimodal composition of the invention is suitable for use in the jacketing layer of a power cable or communication cable, in particular a power cable.

Suitable power cables may be AC or DC and may operate at a low voltage (LV), medium voltage (MV), high voltage (HV) and/or extra-high voltage (EHV) power cables.

High voltage direct current (HV DC) is usually considered to be operating at voltages higher than 36 kV and up to 320 kV DC, extra high voltage direct current (EHV DC) is usually considered to be above 320 kV DC, high voltage alternating current (HV AC) is usually considered to be up to 220 kV AC, and extra high voltage alternating current (EHV AC) is usually considered to be above 220 kV AC. Typically a high voltage direct current (HV DC) power cable and extra high voltage direct current (EHV DC) power cable operate at voltages of 40 kV or higher, even at voltages of 50 kV or higher. A power cable operating at very high voltages is known in the art as extra high voltage direct current (EHV DC) power cable which in practice can operate as high as 900 kV, or possibly even higher.

In a most preferred embodiment, the power cable is a high voltage AC or DC (HV) and/or an extra high voltage AC or DC (EHV) power cable.

The present invention is further directed to a cable comprising a conductor surrounded by at least an inner semiconductive layer, an insulation layer, an outer semiconductive layer and a jacketing layer, in that order, wherein at least the jacketing layer comprises the multimodal composition of the present invention.

The outer semiconductive layer preferably comprises, for example, consists of, a non-crosslinked second semiconductive composition. The inner semiconductive layer, for example, comprises, e.g., consists of, a non-crosslinked first semiconductive composition. The insulation layer may comprise any known insulation material such as an XLPE or polypropylene. In one embodiment, the insulation layer may comprise a multimodal polyethylene composition of the invention.

The first and the second semiconductive compositions can be different or identical and comprise a polymer(s) which is, for example, a polyolefin or a mixture of polyolefins and a conductive filler, e.g., carbon black. Suitable polyolefin(s) are e.g. polyethylene produced in a low pressure process or a polyethylene produced in a HP process (LDPE).

The term "conductor" means herein that the conductor comprises one or more wires. Moreover, the cable may comprise one or more such conductors. Further, the conductor may be a electrical conductor and comprise one or more metal wires.

The thickness of the jacketing layer of the cable is typically 2 mm or more, for example, at least 3 mm, for example, at least 5 to 100 mm, for example, from 5 to 50 mm, and conventionally 5 to 40 mm, e.g. 5 to 35 mm, when measured from a cross section of the jacketing layer of the cable.

The invention also provides a process for producing a cable wherein the process comprises the steps of

- applying on a conductor, at least one layer, wherein the layer comprises a multimodal polyethylene composition of the invention.

EXPERIMENTAL PART

Determination Methods

Unless otherwise stated in the description or experimental part the following methods were used for the property determinations.

wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene. MFR may be determined at different loadings such as 2.16 kg ($MFR_2$) or 21.6 kg ($MFR_{21}$).

Density

The density was measured according to ISO 1183-2. The sample preparation was executed according to ISO 1872-2 Table 3 Q (compression moulding).

GPC

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain), equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS}=19\times10^{-3}\ \text{mL/g}, \alpha_{PS}=0.655$$

$$K_{PE}=39\times10^{-3}\ \text{mL/g}, \alpha_{PE}=0.725$$

$$K_{PP}=19\times10^{-3}\ \text{mL/g}, \alpha_{PP}=0.725$$

A third order polynomial fit was used to fit the calibration data. All samples were prepared in the concentration range of 0.5-1 mg/ml and dissolved at 160° C. for 2.5 hours for PP or 3 hours for PE under continuous gentle shaking.

Flexural Modulus

Flexural modulus was determined according to ISO 178, which describes the procedure for a 3 point bending test. The test specimens were prepared by milling samples 80*15*4 mm from 4 mm thick compression moulded plaques prepared according to EN ISO 17855-2:2016 and tested at a cross-head speed of 2 mm/min using a 100 load cell.

Melting Points

Melting points were determined using Instrument: DSC Q2000 from TA Instruments

Pans: Tzero Al pans

Method: According to ISO-11357-3:

1st heating 10° C./min, 30-180° C.

Isothermal 180° C., 2 min

Cooling 10° C./min, 180–(−30)° C.

Isothermal (−30) ° C., 2 min

2nd heating 10° C./min, (−30)–180° C.

Rheology, Dynamic (Viscosity) Method ISO 6721-1:

Dynamic rheological properties of the polymer, here the polymer composition may be determined using a controlled stress rheometer, using a parallel-plate geometry (25 mm diameter) and a gap of 1.3 mm between upper and bottom plates. Previous to test, samples need to be stabilized by dry blending pellets together with 0.25-0.3% Irganox B225. Irganox B 225 is a blend of 50% Irganox 1010, Pentaerythritol tetrakis(3-(3,5-ditert-butyl-4-hydroxyphenyl)propionate), CAS-no. 6683-19-8 and 50% lrgafos 168, Tris(2,4-di-tert-butylphenyl) phosphite, CAS-no. 31570-04-4. Note that to add an antioxidant, here Irganox B225, is normally not the standard procedure of method 15 ISO 6721-1. Frequency sweep test, i.e. the "Rheology, dynamic (Viscosity) method", was performed according to the ISO standard method, ISO 6721-1 with an angular frequency range from 628-0.01 rad/s. All experiments were conducted under nitrogen atmosphere at a constant temperature of 190° C. and strain within the linear viscoelastic region. During analysis, storage modulus (G'), loss modulus (G"), complex modulus (G*) and complex viscosity (η*) were recorded and plotted versus frequency (w). The measured values of complex viscosity (η*) at angular frequency of 0.05 and 300 rad/s are taken from test. The abbreviation of these parameters 25 are η*0.05 and η*300 respectively. The zero viscosity η*0 value is calculated using Carreau-Yasuda model. For cases when the use of this model for the estimation of the Zero shear viscosity is not recommendable a rotational shear test at low shear rate is performed. This test is limited to a shear rate range of 0.001 to 1 s−1 and a temperature of 190° C.

Taber Abrasion (Wear Index)

Abrasion resistance was tested on 2 mm thick compression moulded plaques prepared by 25 compression moulding at 200° C. with cooling rate 15° C./min. The testing was performed on a Taber abraser according to ASTM D 4060 with the abrasive wheel CS17. Two specimens are tested for each material, and the wear index of the materials is determined after 5000 cycles of abrasion. The wear index is defined as the weight loss in mg per 1000 cycles of abrasion.

Tensile—ISO527-2/5A 50 mm/min

For tensile testing (stress and strain at break), specimens were prepared and measured according to ISO 527-2/5A by die cutting from compression moulded plaques of 1.8 mm thickness tested at 23° C. and 50% relative humidity with 1 kN load cell a tensile testing speed of 50 mm/min, a grip distance of 50 mm and a gauge length of 20 mm.

Shore D

Shore D (3 s) is determined acc. ISO868 on moulded specimen with a thickness of 4 mm. The shore hardness is determined after 3 seconds after the pressure foot is in firm contact with the test specimen. The specimen was moulded according to EN ISO 1872-2.

Stress Relaxation (Relaxation Vs. Time):

To determine the relaxation behaviour, stress relaxation tests were conducted using a Paar Physica MCR 501 rotational rheometer. A parallel-plate geometry with a diameter of 25 mm and a gap of 1.8 mm was chosen as measuring system. The tests were conducted at a set temperature of 190° C. using a strain step of 40%. The test specimens can be prepared in a disk shape by compression moulding with a thickness of about 2 mm, directly on a frame mould or by stamping out from a plaque using a cutting die, with the required diameter. The specimen was loaded between the plates of the pre-heated rheometer and the heating chamber was closed to allow for the sample to melt. Before the application of the strain step, and after loading the sample onto the plates, a waiting time for thermal equilibration inside the heating chamber of about 5 to 10 minutes was applied. The heating chamber was continuously purged with nitrogen during the tests to avoid degradation of the sample. After the step strain is applied, the test geometry was kept on a fixed angular position and the decaying (relaxation) stress (in Pascal, Pa) was determined as a function of time. The relaxation modulus (in Pascal, Pa) as a function of time is then determined by dividing the stress by the applied strain (in dimensionless units). The relaxation behaviour is characterized by the parameter Time (G(t)=100 Pa), which is the time (in seconds) at which the relaxation modulus attains an arbitrary value of 100 Pascal (Pa). Lower values is an indication of lower shrinkage. Materials with high elastic share have taken longer time to relax and consequently most of its elastic stresses would be frozen into the resultant jacket after the drawing operation (Shrinkage).

Comonomer Contents

Quantification of Comonomer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

Catalyst Preparation

As catalyst was used alumoxane containing, supported catalyst containing metallocene bis(1-methyl-3-n-butylcyclopentadienyl) zirconium (IV) chloride and with enhanced ActivCat® activator technology from Albemarle (Grace) Corporation.

Preparation of Polyethylene

The multimodal polyethylene composition was prepared using a prepolymerisation reactor, a first and second slurry-loop reactor as well as a gas phase reactor. The prepolymerisation stage was carried out in slurry in a 50 $dm^3$ loop reactor under conditions and using feeds of catalyst (as prepared above), monomers, antistatic agent and diluent (propane (C3)) as disclosed in Table 1.

The obtained slurry together with the prepolymerized catalyst was continuously introduced into the 150 $dm^3$ first loop reactor. The polymer slurry was continuously withdrawn from the first loop reactor and transferred into the 300 $dm^3$ second loop reactor. The slurry was continuously withdrawn from the second loop reactor to a flash stage where hydrocarbons were removed from the polymer. The polymer was then transferred into a gas phase reactor where the polymerisation was continued. The conditions and feeds/feed ratio in loop and gas phase polymerisation steps are disclosed in Table 2 and 3.

A comparative example 2 is also prepared using the same catalyst.

TABLE 1

| Process conditions in the Prepolymerisation | | | | | | |
|---|---|---|---|---|---|---|
| | | Ex 1 | Ex 2 | Ex 3 | Ex 4 | CE2 |
| Temperature | [° C.] | 50 | 50 | 50 | 50 | 50 |
| Pressure | [bar] | 57.48 | 57.50 | 57.91 | 57.46 | 52.53 |
| split | % | 2.95 | 2.83 | 2.9 | 2.97 | 1.8 |
| C2 feed | g/h | 0.2 | 0.2 | 0.2 | 0.2 | |
| C4 feed | g/h | 101.22 | 99.99 | 49.98 | 49.96 | 56.1 |
| Catalyst feed | g/h | 39.43 | 43.11 | 48.47 | 50.00 | 31.7 |

TABLE 2

| | | Ex 1 | Ex 2 | Ex 3 | Ex 4 | CE2 |
|---|---|---|---|---|---|---|
| Process condition in the Loop reactor 1 (fraction ai) | | | | | | |
| Temperature | [° C.] | 85 | 85 | 85 | 85 | Not in use |
| Pressure | [bar] | 55.56 | 55.51 | 55.55 | 55.53 | |
| H2/C2 | mol/kmol | 0.47 | 0.57 | 0.24 | 0.29 | |

TABLE 2-continued

| | | Ex 1 | Ex 2 | Ex 3 | Ex 4 | CE2 |
|---|---|---|---|---|---|---|
| C4/C2 | mol/kmol | 25.34 | 69.77 | 3.34 | 3.96 | |
| Split | % | 18.27 | 23.48 | 18.90 | 22.35 | |
| Total of Prepol + loop1 | % | 21.22 | 26.31 | 21.8 | 25.32 | |
| MFR2 | g/10 min | 26.2 | | 14 | 30.4 | |
| Process condition in the Loop reactor 2 (fraction aii) | | | | | | |
| Temperature | [° C.] | 85 | 85 | 85 | 85 | 85 |
| Pressure | [bar] | 53.74 | 53.70 | 53.75 | 53.73 | 52.16 |
| H2/C2 | mol/kmol | 0.48 | 0.25 | 0.33 | 0.28 | 0.0 |
| C4/C2 | mol/kmol | 184.62 | 122.42 | 2.69 | 7.42 | 80.0 |
| Split | % | 21.83 | 23.31 | 18.88 | 22.07 | 35.3 |
| LMW split (ai + aii) | % | 43.05 | 49.62 | 40.68 | 47.39 | |
| MFR2 | g/10 min | 112 | | 31 | 55.3 | 43.0 |

TABLE 3

| Process conditions in the Gas phase reactor (HMW component) | | | | | | |
|---|---|---|---|---|---|---|
| | | Ex 1 | Ex 2 | Ex 3 | Ex 4 | CE2 |
| Temperature | [° C.] | 75 | 80 | 80 | 80 | 75 |
| Pressure | [bar] | 20.01 | 20.0 | 20.0 | 20.0 | 20.04 |
| H2/C2 | mol/kmol | 0.036 | 0.081 | 0.082 | 0.120 | 0.1 |
| C4/C2 | mol/kmol | 0 | 0 | 0 | 0 | 0 |
| C6/C2 | mol/kmol | 4.07 | 6.37 | 8.27 | 14.44 | 2.7 |
| split | % | 56.95 | 50.38 | 59.32 | 52.61 | 62.9 |

For all the tables:

- C2: ethylene
- H2: hydrogen
- C4: 1-butene
- C6: 1-hexene

The polymer obtained from the gas phase reactor is pelletised with 0.22 wt % of 1:1 mixture of Pentaerythrityl-tetrakis(3-(3',5'-di-tert. butyl-4-hydroxyphenyl)-propionate cas nr 6683-19-8 and Tris (2,4-di-t-butylphenyl) phosphite cas nr 31570-04-4, 0.15 wt % of Calcium stearate cas nr 1592-23-0 and 0.3 wt % of 1:1 mixture of Dimethyl succinate polymer with 4-hydroxy-2,2,6,6-tetramethyl-1-piperidine ethanol cas nr 65447-77-0 and Poly((6-((1,1,3,3-tetramethylbutyl)amino)-1,3,5-triazine-2,4-diyl)(2,2,6,6-tetramethyl piperidyl)imino)-1,6-hexanediyl ((2,2,6,6-tetramethyl-4-piperidyl)imino)) cas nr 71878-19-8.

The properties are determined on the pellets (other than * marked properties of CE2—determined on powder). The inventive examples are compared to a commercial HDPE copolymer (CE1) of density 945 kg/m$^3$ and MFR2 of 1.89 g/10 min or a bimodal HDPE (CE2).

TABLE 5

| | | Ex 1 | Ex 2 | Ex 3 | Ex 4 | CE1 | CE2 |
|---|---|---|---|---|---|---|---|
| Density | Kg/m$^3$ | 941.5 | 941.1 | 943.5 | 943.3 | 945 | 942* |
| MFR2 | g/10 min | 0.72 | 2.14 | 1.38 | 2.95 | 1.89 | 0.44* |
| MFR5 | g/10 min | 2.04 | 6.28 | 3.8 | 8.14 | | |
| MFR21 | g/10 min | 22.6 | 68.3 | 34.9 | 85.3 | 108 | |
| Melting point | ° C. | 126 | 127 | 128 | 125 | 127 | |
| Flexural Modulus | MPa | 633 | 737 | 724 | 642 | 924 | 1000 |
| Taber abrasion | mg/1000 | 9.8 | 10.8 | 8.6 | 11.5 | 11.6 | |
| C4 | Mol % | 0.25 | 0.37 | 0 | 0 | 1.62 | 0.23 |
| C6 | Mol % | 0.31 | 0.3 | 0.54 | 0.77 | — | 0.15 |
| Mn | | 12950 | 12450 | 11550 | 9700 | 9265 | 18900 |
| Mw | | 114500 | 84550 | 94800 | 77700 | 103500 | 135500 |
| Mz | | 342000 | 241000 | 243500 | 203500 | 502000 | 352000 |
| Mw/Mn | | 8.86 | 6.78 | 8.21 | 8.01 | 11.2 | 7.14 |
| Strain at break | % | 757 | 773 | 683 | 636 | 787 | 904 |
| Stress at break | MPa | 38.1 | 33.27 | 36.77 | 31.91 | 26.4 | 44.9 |
| Shore D (3 seconds) | | 58.5 | 58.5 | 59 | 58.5 | 59.7 | 57.6 |
| Relaxation vs time (s) | | 6.20 | 2.00 | 2.66 | 1.32 | 6.15 | 7.3 |

Lower values of relaxation vs time is an indication of lower shrinkage.

Materials with high elastic share have taken longer time to relax and consequently most of its elastic stresses would be frozen into the resultant jacket after the drawing operation (Shrinkage).

TABLE 6

| | Rheology | | | Flexural |
|---|---|---|---|---|
| | Temp (° C.) | eta (0.05 rad/s) (Pa · s) | eta (300 rad/s) (Pa · s) | modulus MPa |
| Ex 1 | 190 | 12175 | 968 | 633 |
| Ex 2 | 190 | 4249 | 656 | 737 |
| Ex 3 | 190 | 6110 | 889.5 | 724 |
| Ex 4 | 190 | 3061 | 613 | 642 |
| CE1 | 190 | 7070 | 556 | 924 |
| CE2 | 190 | 1998 | 1505 | 1000 |

As can be seen form table 5/6, the multimodal polyethylene composition of the invention show excellent low flexural modulus and abrasion resistance. They outperform similar bimodal copolymers. In particular, the split loop provides good flexural modulus. The polyethylenes in accordance with the present invention, are suitable for use in cable jackets.

The invention claimed is:

1. A multimodal polyethylene composition having:
(A) a lower molecular weight (LMW) ethylene homo or copolymer component; and
(B) a higher molecular weight ethylene copolymer component;
wherein the LMW component comprises two fractions (ai) and (aii);
wherein each fraction (ai) and (aii) of the lower molecular weight ethylene homo or copolymer component (A) forms at least 12 wt % of the multimodal polyethylene composition;
wherein component (B) forms at least 40 wt % of the multimodal polyethylene composition;
wherein the multimodal polyethylene composition has a density of 930 $kg/m^3$ or more (ISO1183), an $MFR_2$ (ISO1133 at 190° C. and 2.16 kg load) in the range of 0.05 to 10 g/10 min, a flex modulus of up to 800 MPa (ISO 178:2010), and a taber abrasion resistance of 8.0 to 13.0 mg/1000 cycle (ASTM D 4060:2014); and
wherein the multimodal polyethylene composition has a Mw/Mn (MWD) of 5 to 15 (measured by GPC).

2. The multimodal polyethylene composition of claim 1, wherein:
(A) the lower molecular weight ethylene homopolymer or copolymer component comprises:
(ai) 40 to 60 wt % of a first ethylene homopolymer fraction or copolymer fraction of ethylene and one or more C3-10 alpha olefins; and
(aii) 40 to 60 wt % of a second ethylene homopolymer fraction or copolymer fraction of ethylene and one or more C3-10 alpha olefins, wherein the second ethylene homopolymer fraction or copolymer fraction of ethylene and one or more C3-10 alpha olefins is different than the first ethylene homopolymer fraction or copolymer fraction of ethylene and one or more C3-10 alpha olefins; and
(B) the higher molecular weight ethylene copolymer component comprises a higher molecular weight ethylene copolymer of ethylene and one or more C3-10 alpha olefins.

3. The multimodal polyethylene composition of claim 2, wherein the multimodal polyethylene composition comprises:
(A) 35 to 60 wt % of the lower molecular weight ethylene homopolymer or copolymer component comprising; and
(B) 40 to 65 wt % of the higher molecular weight ethylene copolymer component.

4. The multimodal polyethylene composition of claim 2, wherein the multimodal polyethylene composition comprises at least two C3-10 alpha olefin comonomers, and further wherein the multimodal polyethylene composition comprises:
(B) 40 to 65 wt % of the higher molecular weight ethylene copolymer component.

5. The multimodal polyethylene composition of claim 1, wherein:
(A) the lower molecular weight ethylene homopolymer or copolymer component comprises a lower molecular weight ethylene homopolymer or copolymer with one or more C3-8 alpha olefins; and
(B) the higher molecular weight ethylene copolymer component comprises a higher molecular weight ethylene copolymer with one or more C3-8 alpha olefins.

6. The multimodal polyethylene composition of claim 1, wherein the multimodal polyethylene composition comprises 35 to 60 wt % of said lower molecular weight component and 40 to 65 wt % of said higher molecular weight component.

7. The multimodal polyethylene composition of claim 1, wherein:
(A) the lower molecular weight ethylene homo or copolymer component comprises a lower molecular weight ethylene homopolymer or ethylene 1-butene copolymer; and
(B) the higher molecular weight ethylene copolymer component comprises a higher molecular weight ethylene 1-hexene copolymer component.

8. The multimodal polyethylene composition of claim 1, wherein the multimodal polyethylene composition is obtained using a single site catalyst.

9. The multimodal polyethylene composition of claim 1, wherein the multimodal polyethylene composition is not crosslinked.

10. The multimodal polyethylene composition of claim 1, wherein the multimodal polyethylene composition has a melting point of at least 122° C.

11. The multimodal polyethylene composition of claim 1, wherein the multimodal polyethylene composition has an $MFR_2$ of 0.05 to 5.0 g/10 min (ISO1133, at 190° C. and 2.16 kg load) and/or a density in the range of 938 to 950 $kg/m^3$.

12. The multimodal polyethylene composition of claim 1, wherein the multimodal polyethylene composition has:
a flex modulus of 500 to 775 MPa;
a comonomer content of 0.5 to 1.0 mol %;
an Mw/Mn of 5 to 12;
a taber abrasion resistance of 8.0 to 12.0 mg/1000 cycle;
or a combination thereof.

13. The multimodal polyethylene composition of claim 1, wherein the multimodal polyethylene composition has a melting point and the ratio between the flex modulus (MPa) and the melting point (Celsius) of the multimodal polyethylene composition is between 4.5 and 6.5 (MPa/Celsius).

14. A cable comprising a conductor surrounded by at least one layer comprising the multimodal polyethylene composition of claim 1.

15. The cable of claim 14, wherein the multimodal polyethylene composition forms at least 80 wt % of the layer in which it is present.

16. The cable of claim 14, wherein the cable is a communication cable or a power cable.

17. A process for the preparation of the multimodal polyethylene composition of claim 1, said process comprising:
(I) polymerizing ethylene and optionally at least one C3-10 alpha olefin comonomer in the presence of a single site catalyst in a first slurry reactor to produce the fraction (ai);
(II) polymerizing ethylene and optionally at least one C3-10 alpha olefin comonomer in the presence of the single site catalyst and fraction (ai) in a second slurry reactor so as to prepare the fraction (aii), which together with fraction (ai) forms said lower molecular weight ethylene homo or copolymer component (A); and
(III) in the presence said LMW ethylene homo or copolymer component (A) and said single site catalyst, polymerizing ethylene and at least one C3-10 alpha olefin comonomer so as to form said higher molecular weight ethylene copolymer component (B).

18. The multimodal polyethylene composition of claim 1, wherein the lower molecular weight ethylene homo or copolymer component comprises:

(ai) a first ethylene homopolymer or ethylene 1-butene copolymer fraction; and (aii) a second different homopolymer or ethylene 1-butene copolymer fraction.

19. The cable of claim 14, wherein the at least one layer comprising the multimodal polyethylene composition is a cable jacket layer.

20. The cable of claim 14, wherein the cable is an AC or DC power cable.

* * * * *